Aug. 4, 1964  A. KRATOCHVIL  3,143,006
GEAR TRAIN
Filed Nov. 13, 1962

INVENTOR:
ANTON KRATOCHVIL
BY: *Arthur J. Hanamann*
ATTORNEY

United States Patent Office 3,143,006
Patented Aug. 4, 1964

3,143,006
GEAR TRAIN
Anton Kratochvil, 1418 Washington Ave., Racine, Wis.
Filed Nov. 13, 1962, Ser. No. 237,165
4 Claims. (Cl. 74—797)

This invention relates to a gear train, and more particularly it relates to a gear train which is useful in transmitting the force required in steering an automobile to the steering linkage of the automobile, truck, or other vehicle.

It is an object of this invention to provide an improved gear train, and particularly to provide a gear train which can be used in the steering of an automobile to reduce the force required on the steering wheel for steering.

A particular object of this invention is to provide a gear train, including a planetary gear set, wherein the gear train is activated in a common direction of rotation off both the ring gear and the sun gear of said planetary set.

Thus a relatively simple but efficient gear train is provided wherein the input force applied to a planetary gear set is transmitted to the remainder of the gear train with both the ring gear and the sun gear of the planetary gear set transmitting rotation to the remainder of the gear train in the same rotative direction so that complete and maximum effect is derived from the input force.

Other objects and advantages will become apparent upon reading the following description in light of the accompanying drawings wherein.

Figure 1:
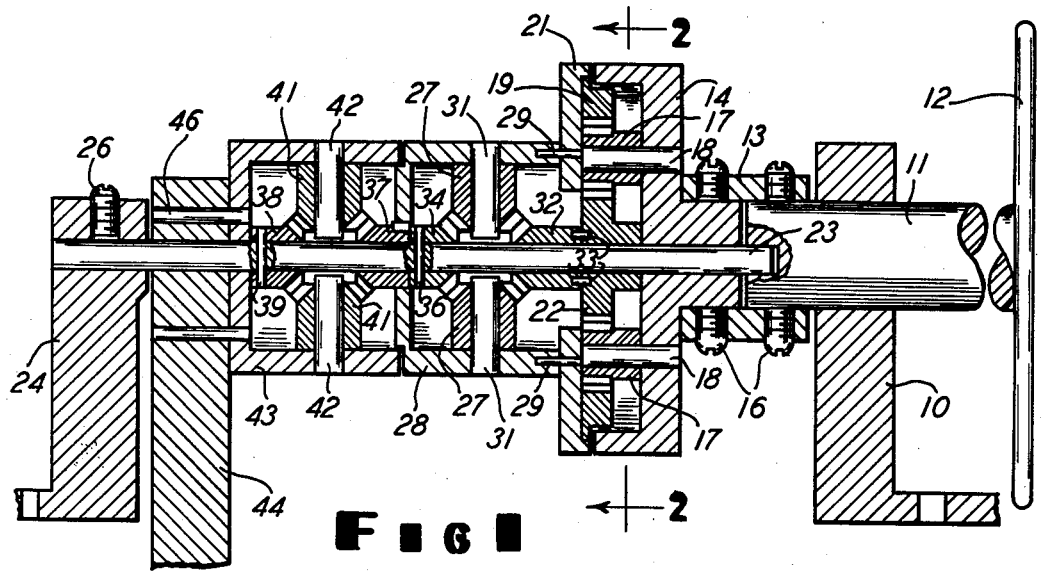
FIG. 1 is a sectional view of a schematic showing of a preferred arrangement of the gear set of this invention.

A fixed bracket 10 rotatably supports a shaft 11 which is connected to the steering wheel 12 and these parts can therefore be the steering post 11 and steering wheel 12 of a conventional automobile. A sleeve 13 extends between a hub 14 and the shaft 11, and secure means or set screws 16 are disposed in the sleeve 13 to join the shaft 11 and the hub 14 together in rotative relation so that rotation of shaft 11 will of course be transmitted to the hub 14 which is also a planetary gear spider.

It will further be noted that the spider 14 carries planetary gears 17 which are rotatably mounted on the spider 14 by means of the pins 18. Still further, the planetary gears 17 engage a ring gear 19 which is secured in a housing member 21 to support the ring gear 19 and of course rotate therewith. To complete the description of the planetary gearing, a sun gear 22 is shown to be in mesh with the planet gears 17 and the sun gear is therefore rotatably supported on a shaft 23 which is non-rotatably mounted and secured by a fixed bracket 24 having a set screw 26. Thus the shaft 23 is non-rotatable and it serves to support the sun gear 22 and it extends through the spider 14 as shown, and of course the sun gear 22 and the shaft 23 are coaxial.

The ring gear 19 is rotatably connected to bevel gears 27 through a sleeve or housing 28 which is attached to the housing 21 by the pins 29. Thus the two housings 21 and 28 rotate together in unison and the shafts 31 carry the bevel gears 27 so that the latter orbit around the fixed shaft 23. It will further be noted that another bevel gear 32 is mounted on the shaft 23 to rotate thereon, and keys or pins 33 connect the sun gear 22 and the bevel gear 32 so that they rotate together in unison. It will therefore be understood that the bevel gears 27 and 32 are in mesh, and the bevel gear 32 is rotated with the sun gear 22, while the bevel gear 27 is rotated with the ring gear 19.

Another bevel gear 34 is mounted on the shaft 23, but this bevel gear is affixed to the shaft by means of the pin 36 so that it does not rotate, but is stationary along with the shaft 23. With this arrangement, a planetary gear set is provided by the bevel gears, with the gears 27 orbiting the gears 32 and 34.

Figure 2:
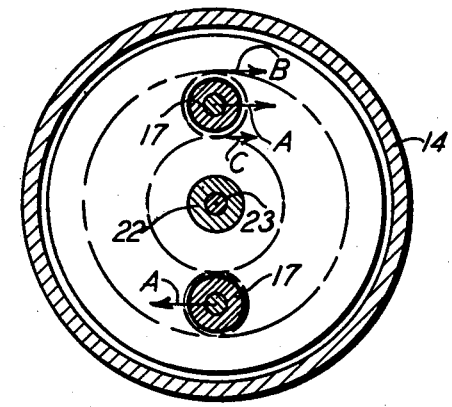
FIG. 2 is a sectional view taken on the line 2—2 of FIG. 1.

FIG. 2 thus shows that if the direction of orbiting of the pins 18 is in the direction of the arrow designated "A," then the planet gears 17 will rotate the ring gear 19 in the same direction, as indicated by arrow "B," and they will also rotate the sun gear 22 in the same direction, as indicated by arrows "C." At the same time that the planet gears are orbiting in the direction indicated by arrows "A," these planet gears happen to rotate in the opposite direction about their pins 18. Thus the bevel gears 27 will orbit in the rotative direction shown, that is, the direction indicated by arrow "A," and also the bevel gear 32 will rotate in the direction shown, namely the direction indicated by arrow "C." This therefore creates a gearing down through the first planetary unit, with both the ring gear and the sun gear of the unit applying forces in the same direction. The result is a force applied to the housing member 28 through both the ring gear 19 and the sun gear 22.

The housing or carrier 28 has a bevel gear 37 connected thereto for rotation along with the housing 28, and such connection is keyed together, and thus the rotation of the housing 28 is imposed upon the bevel gear 37 which is rotatably mounted on the shaft 23. Another bevel gear 38 is mounted on the shaft 23 and is non-rotatably secured thereto by the pin 39 to be stationary, and the gears 37 and 38 mesh with bevel planet gears 41, which are supported on shafts 42 mounted on the housing or carrier 43. It will therefore be understood that rotation of the carrier 28 rotates the gear 37, and in turn rotates the bevel gears 41 about their pins or shafts 42, and since the gear 38 is stationary, the carrier 43 is also rotated.

Steering linkage 44 is connected to the carrier 43 by means of pins 46, and thus the displacement or rotation of the carrier 43 causes similar movement of the linkage 44 for the well-known operation of turning the automobile wheels (not shown).

It will therefore be understood that a series of planetary gearing is arranged in a novel manner to produce a reduced rotation at the steering linkage 44 compared to the rotation of the steering wheel 12, and likewise an increased force is applied at the linkage 44 compared to the force applied to the steering wheel 12. The force applied to the planetary gears 17 is divided between the ring gear 19 and the sun gear 22, such that the ring gear force is transmitted to the planetary gear 37, while the sun gear force is transmitted to the planetary gears 27, then to the carrier 28. Because the radius of the ring gear 19 is greater than the radius of the bevel gear 37, there is a mechanical advantage in transmitting the force applied to the gear 19 down to the bevel gear 37. Of course there is additional mechanical advantage in transmitting the force applied to the gear 37 to the planet gears 41, since there is a lever advantage in that transmission also, and thus additional mechanical advantage in transmitting the force to the carrier 43. Also there is a mechanical advantage in transmitting the force applied to the sun gear 22 to the bevel gear 32, since the radius of the latter is less than the radius of the sun gear 22. And again the transmission of the force to the bevel gears 27 and the carrier 28 is with a mechanical advantage by virtue of the planetary system shown.

There is thus provided a gear train which may be used for mechanical advantage in the transmitting of force in steering any vehicle, such as an automobile, a truck, or a bus, or the like, and of course the gear train may be used in other installations.

What is claimed is:

1. A gear train for automobile power steering connectable intermediate a steering wheel and steering linkage, comprising a planetary gear set of a ring gear and a sun gear and a planet gear with the latter operatively connectable with said steering wheel, a fixed shaft extending coaxially with said sun gear, two oppositely disposed bevel gears axially mounted on said shaft in spaced-apart relation with one of said bevel gears connected to said sun gear for rotation therewith and the other of said bevel gears being non-rotatably fixed on said shaft, an additional bevel gear, all said bevel gears being in meshed relation and with said additional bevel gear disposed intermediate the other said two bevel gears for orbiting same, means operatively interconnecting said ring gear and said additional bevel gear to synchronize the rotation of said ring gear and the orbital movement of said additional bevel gear, and means for operatively interconnecting said additional bevel gear and said steering linkage.

2. A gear train connectable between two rotatable members, comprising a planetary gear set of a ring gear and a sun gear and a planet gear with the latter being operatively connectable with one of said members, a fixed shaft extending coaxially with said sun gear, two oppositely disposed bevel gears axially mounted on said shaft in spaced-apart relation with one of said bevel gears connected to said sun gear for rotation therewith and the other of said bevel gears being fixed on said shaft to be non-rotatable therewith, an additional bevel gear, all said bevel gears being in meshed relation and with said additional bevel gear disposed intermediate the other said two bevel gears for orbiting same, means operatively interconnecting said ring gear and said additional bevel gear to synchronize the rotation of said ring gear and the orbital movement of said additional bevel gear, and means for operatively interconnecting said additional bevel gear and the other of said rotatable members.

3. A gear train for vehicle power steering connectable intermediate a steering wheel and steering linkage, comprising a planetary gear set of a ring gear and a sun gear and a planet gear with the latter operatively connectable to said steering wheel, a non-rotatable shaft extending coaxially with said sun gear, two oppositely disposed bevel gears axially mounted on said shaft in spaced-apart relation with one of said bevel gears connected to said sun gear for rotation therewith and the other of said bevel gears being fixed on said shaft to be non-rotatable therewith, an additional bevel gear, all said bevel gears being in meshed relation and with said additional bevel gear disposed intermediate the other said two bevel gears for orbiting same, carrier means operatively interconnecting said ring gear and said additional bevel gear to synchronize the rotation of said ring gear and the orbital movement of said additional bevel gear, an additional planetary set of bevel gears mounted on said shaft and being operatively connected to said carrier means to be rotated by said carrier means, and means for operatively interconnecting said additional planetary set of bevel gears and said steering linkage.

4. A gear train connectable between two rotatable members, comprising a planetary gear set of a ring gear and a sun gear and a planet gear with the latter being operatively connectable with one of said rotatable members, a fixed shaft extending coaxially with said sun gear, two oppositely disposed bevel gears axially mounted on said shaft in spaced-apart relation with one of said bevel gears connected to said sun gear for rotation therewith and the other of said bevel gears being fixed on said shaft to be non-rotatable, an additional bevel gear, all said bevel gears being in meshed relation and with said additional bevel gear disposed intermediate the other said two bevel gears for orbiting same, carrier means operatively connected to said ring gear and said additional bevel gear to synchronize the rotation of said ring gear and the orbital movement of said additional bevel gear, another planetary set of bevel gears mounted on said shaft with two bevel gears coaxial with said shaft and one of the latter said two bevel gears being non-rotatably mounted and the other gear of the latter said two bevel gears being rotatably mounted, the planetary gear of said another planetary set being in mesh with the latter said two bevel gears, said other gear being operatively connected to said carrier means to rotate together, and means for operatively interconnecting said planetary gear and the other of said rotatable members.

References Cited in the file of this patent
UNITED STATES PATENTS

| | | |
|---|---|---|
| 599,870 | Scofield | Mar. 1, 1898 |
| 847,405 | Ford | Mar. 19, 1907 |
| 1,352,868 | Blomstrom | Sept. 14, 1920 |
| 2,948,164 | Neal | Aug. 9, 1960 |